United States Patent
Tokita

(10) Patent No.: US 6,603,317 B2
(45) Date of Patent: Aug. 5, 2003

(54) LEAKAGE CURRENT REDUCTION CIRCUIT AND POWER SUPPLY EMPLOYING THE SAME

(75) Inventor: Yoshitaka Tokita, Yamagata (JP)

(73) Assignee: NEC Corporation, Tokyo (JP)

(*) Notice: Subject to any disclaimer, the term of this patent is extended or adjusted under 35 U.S.C. 154(b) by 16 days.

(21) Appl. No.: 09/789,733

(22) Filed: Feb. 22, 2001

(65) Prior Publication Data

US 2001/0015648 A1 Aug. 23, 2001

(30) Foreign Application Priority Data

Feb. 23, 2000 (JP) ........................................ 2000-045296

(51) Int. Cl.$^7$ ............................................... G01R 27/28
(52) U.S. Cl. ....................................................... 324/628
(58) Field of Search ............................. 324/628; 361/15, 361/16, 17, 18; 363/15, 21.08, 21.09, 21.1

(56) References Cited

U.S. PATENT DOCUMENTS

| | | | |
|---|---|---|---|
| 4,686,614 A | * 8/1987 | Costello | 363/17 |
| 5,757,628 A | * 5/1998 | Kamata | 363/21 |
| 5,808,879 A | * 9/1998 | Liu et al. | 363/17 |
| 5,817,130 A | * 10/1998 | Cox et al. | 607/5 |
| 6,094,365 A | * 7/2000 | Chiao | 363/56 |

FOREIGN PATENT DOCUMENTS

| JP | 61-176988 | 11/1986 |
|---|---|---|
| JP | 2-79766 | 3/1990 |
| JP | 4-178169 | 6/1992 |

OTHER PUBLICATIONS

Japanese Office Action dated Nov. 26,2002 (a translation of the relevant protion will be subnitted shortly).

* cited by examiner

Primary Examiner—Safet Metjahic
Assistant Examiner—Etienne P LeRoux
(74) Attorney, Agent, or Firm—McGinn & Gibb, PLLC

(57) ABSTRACT

In a power supply (AC adapter etc.) of an electronic device, a first Y capacitor and a second Y capacitor are connected in series between two AC input lines which are connected to an input AC cable of the power supply so that input AC voltage will be divided, and a third Y capacitor for the prevention of EMI (Electro-Magnetic Interference) is provided between a grounding line on the secondary side of a transformer of the power supply and the connection point between the first Y capacitor and the second Y capacitor. The capacitance of the second Y capacitor is set larger than that of the first Y capacitor and the second Y capacitor having the larger capacitance is connected to a neutral-side AC input line which is connected to the neutral terminal of an AC socket. Due to the capacitance difference between the first Y capacitor and the second Y capacitor, voltage difference between metal part of the electronic device and the ground is reduced, and thereby the electric shock problem of the electronic device is eliminated or reduced considerably. The reduction of the electric shock problem can be attained without deteriorating the portability of the electronic device and the EMI prevention capability.

18 Claims, 10 Drawing Sheets

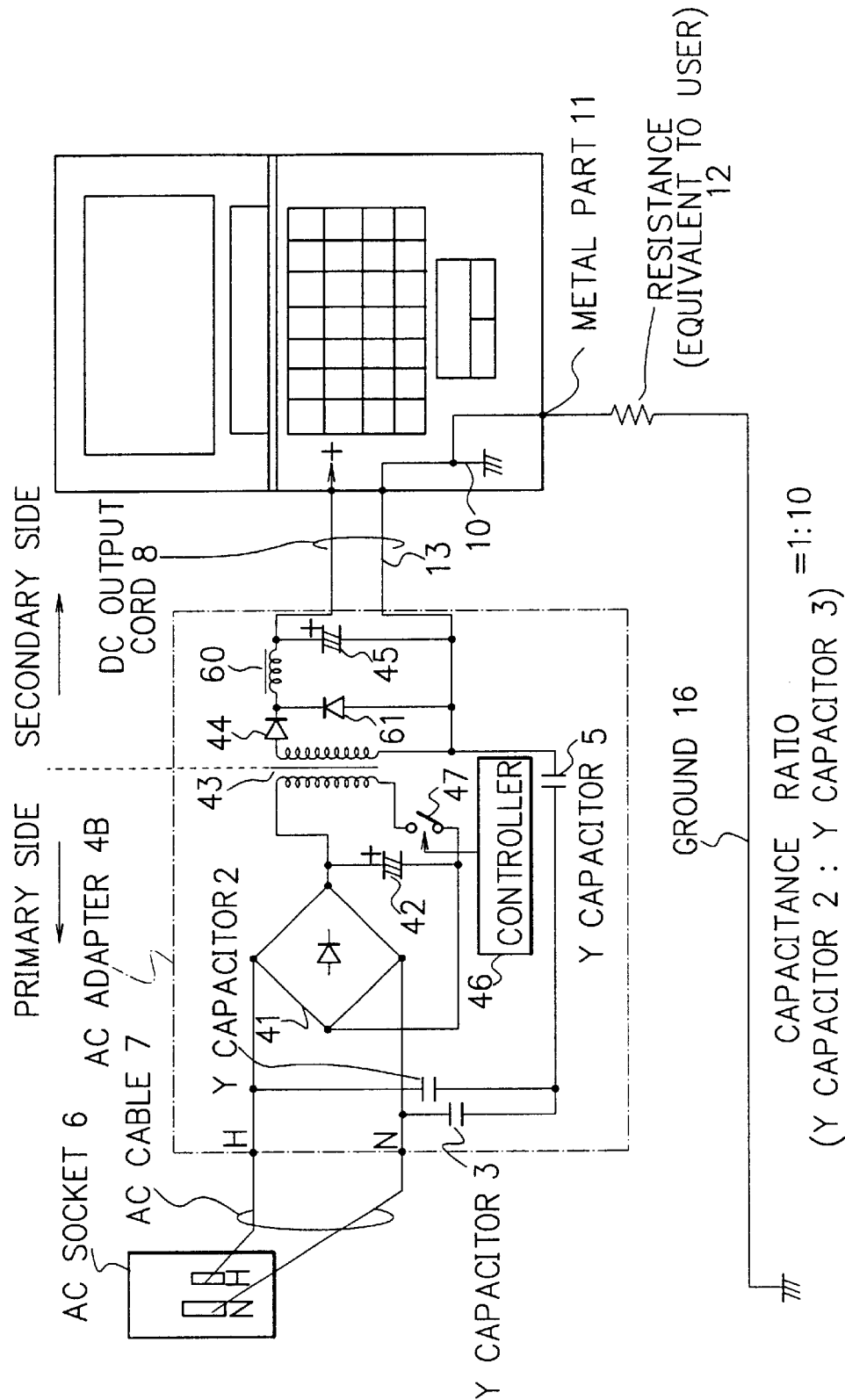

LEAKAGE CURRENT REDUCTION CIRCUIT AND POWER SUPPLY EMPLOYING THE SAME

BACKGROUND OF THE INVENTION

The present invention relates to a leakage current reduction circuit and a power supply employing the leakage current reduction circuit, and in particular, to a leakage current reduction circuit capable of reducing leakage current of a switching power supply.

DESCRIPTION OF THE RELATED ART

AC adapters are widely used as power supplies of electronic devices, especially for portable electronic devices such as notebook computers. An AC adapter generally includes a Y capacitor as a component for preventing EMI (Electro-Magnetic Interference). The electric shock problem of electronic devices is mainly attributed to two factors: leakage current and input voltage. If we assume that the input voltage is set constant, the leakage current is determined by the capacitance of the Y capacitor. When the capacitance of the Y capacitor is decreased, the leakage current becomes smaller and thereby the electric shock to the user of the electronic device also becomes smaller. In order to reduce the leakage current to a level at which the electric shock is negligible, the capacitance of the Y capacitor has to be reduced to a very low level, while the prevention of the EMI becomes incomplete if the capacitance is reduced to the low level. Therefore, under the present situation, the capacitance of the Y capacitor can not be reduced enough for the reduction of the leakage current and the electric shock problem.

FIG. 1 is a circuit diagram showing an example of a conventional AC adapter employing a Y capacitor. The AC adapter 104A shown in FIG. 1, which is implemented as a switching power supply of flyback type (flyback converter), includes a rectifier 41 (which is composed of a diode bridge), a smoothing capacitor 42, a transformer 43, a rectifier 44 (which is composed of a diode), a smoothing capacitor 45, a controller 46, a switching element 47, and a Y capacitor 5. Commercial AC power from an AC socket 6 is supplied to the AC adapter 104A through an AC cable 7.

The AC input is rectified by the rectifier 41 and the rectified output of the rectifier 41 is smoothed by the smoothing capacitor 42, thereby conversion of the input AC voltage to a DC voltage is conducted first. The DC voltage is converted again to an AC voltage by on-off action of the switching element 47, and the AC voltage is supplied to the primary coil of the transformer 43. The on-off action of the switching element 47 is controlled by the controller 46.

An AC voltage obtained at the secondary coil of the transformer 43 is converted again to a DC voltage by the rectifier 44 and the smoothing capacitor 45. The DC voltage obtained by the above operation is supplied to a notebook computer 9 through a DC output cord 8. The Y capacitor 5 for the prevention of the EMI is inserted between a grounding line 13 on the secondary side of the transformer 43 and the midpoint of the rectifier 41 on the primary side of the transformer 43.

In every electronic device, a component equivalent to the Y capacitor 5 causes leakage current by nature. Therefore, when the voltage of the AC socket 6 is AC 120V, voltage difference of approximately AC 60V appears between metal part 11 of the notebook computer 9 and a ground 16, thereby a leakage current which is proportional to the capacitance of the Y capacitor 5 and which depends on the resistance between the metal part 11 and the ground 16 passes between the metal part 11 and the ground 16 (that is, passes through the user of the notebook computer 9). When the user (equivalent resistance 12 shown in FIG. 1) is touching the metal part 11 of the notebook computer 9, there is a possibility that a leakage current of approximately 100 μA passes through the user. The leakage current of such a low level is safe for the user, however, there exist rare cases where the user feels an electric shock.

FIG. 2 is a circuit diagram showing another example of a conventional AC adapter. The AC adapter 104B shown in FIG. 2 is a switching power supply of the flyback type (flyback converter), further including two Y capacitors. Also in the example of FIG. 2, voltage difference of approximately AC 60V appears between the metal part 11 of the notebook computer 9 and the ground 16, and there is a possibility that the user touching the metal part 11 feels an electric shock.

FIG. 3 is a circuit diagram showing another example of a conventional AC adapter. The AC adapter 104C shown in FIG. 3 is a switching power supply of RCC type (RCC converter). The AC adapter 104C of FIG. 3 has different composition on the primary side of the transformer 43, in comparison with the conventional flyback-type AC adapter 104A of FIG. 1.

FIG. 4 is a circuit diagram showing another example of a conventional AC adapter. The AC adapter 104D shown in FIG. 4 is a switching power supply of the RCC type (RCC converter), further including two Y capacitors.

FIG. 5 is a circuit diagram showing another example of a conventional AC adapter. The AC adapter 104E shown in FIG. 5 is a switching power supply of forward type (forward converter). The AC adapter 104E of FIG. 5 has different composition on the secondary side of the transformer 43, in comparison with the conventional flyback-type AC adapter 104A of FIG. 1.

FIG. 6 is a circuit diagram showing another example of a conventional AC adapter. The AC adapter 104F shown in FIG. 6 is a switching power supply of the forward type (forward converter), further including two Y capacitors.

Also in the examples of FIGS. 3 through 6, voltage difference of approximately AC 60V appears between the metal part 11 of the notebook computer 9 and the ground 16 and there is a possibility that the user touching the metal part 11 feels an electric shock.

The maximum permissible level of the leakage current has been determined by UL (Underwriters Laboratories Inc.) etc., and leakage current below the maximum permissible level is generally regarded as safe. However, there have been some reports in recent years that electric shocks are felt by some users even if the leakage current is within the maximum permissible level. Therefore, the reduction or elimination of the electric shock without sacrificing the EMI prevention capability is required today.

For meeting the request, grounding by use of 3-terminal AC input have been generally employed. FIG. 7 is a circuit diagram showing an example of a conventional flyback-type AC adapter employing the 3-terminal AC input and the grounding, in which the same reference characters as those of FIG. 1 designate the same or corresponding parts to those of FIG. 1 and thus repeated description thereof is omitted for brevity. In the example shown in FIG. 7, the AC socket 6 is composed of three terminals including a GND (grounding) terminal which is grounded. The electric shock can be eliminated by connecting a GND (grounding) terminal of the AC adapter 104G to the GND terminal of the AC socket 6 by use of a grounding wire.

However, the AC sockets 6 employed in ordinary houses and office buildings have 2-terminal structure in most cases, and thus the grounding to the GND terminal is difficult. Even if the AC socket 6 is provided with a GND terminal, portable electronic devices (notebook computers etc.), which are supposed to be carried freely, can not be connected to the GND terminal by use of the grounding wire constantly.

On the other hand, if a portable electronic device is always required to be connected to the GND terminal by use of the grounding wire, portability has to be sacrificed and the advantage and commercial value of the portable electronic device are necessitated to be impaired.

SUMMARY OF THE INVENTION

It is therefore the primary object of the present invention to provide a leakage current reduction circuit and a power supply employing the leakage current reduction circuit, by which the leakage current and the electric shock problem of an electronic device employing the leakage current reduction circuit or the power supply can be reduced without deteriorating the portability of the electronic device and the EMI prevention capability.

In accordance with a first aspect of the present invention, there is provided a leakage current reduction circuit for a power supply which converts an input AC voltage to a DC voltage, supplies the DC voltage to the primary side of a transformer intermittently, converts an AC voltage obtained on the secondary side of the transformer to a DC voltage, and outputs the obtained DC voltage. The leakage current reduction circuit includes a first capacitor, a second capacitor and a third capacitor. The first capacitor and the second capacitor are connected in series between two AC input lines which are connected to an input AC cable of the power supply so that the input AC voltage will be divided. The third capacitor for the prevention of EMI (Electro-Magnetic Interference) is provided between a grounding line on the secondary side of the transformer and the connection point between the first capacitor and the second capacitor. The capacitance of the second capacitor is set larger than the capacitance of the first capacitor and the second capacitor having the larger capacitance is connected to one of the two AC input lines that is connected to a neutral line of the input AC cable.

In accordance with a second aspect of the present invention, in the first aspect, capacitance ratio between the first capacitor and the second capacitor is set to approximately 1:10.

In accordance with a third aspect of the present invention, in the first aspect, the leakage current reduction circuit is employed for a flyback-type power supply.

In accordance with a fourth aspect of the present invention, in the first aspect, the leakage current reduction circuit is employed for an RCC-type power supply.

In accordance with a fifth aspect of the present invention, in the first aspect, the leakage current reduction circuit is employed for a forward-type power supply.

In accordance with a sixth aspect of the present invention, in the first aspect, the leakage current reduction circuit is employed for a power supply for a portable electronic device.

In accordance with a seventh aspect of the present invention, there is provided a power supply which converts an input AC voltage to a DC voltage, supplies the DC voltage to the primary side of a transformer intermittently, converts an AC voltage obtained on the secondary side of the transformer to a DC voltage, and outputs the obtained DC voltage, comprising: a first capacitor and a second capacitor which are connected in series between two AC input lines which are connected to an input AC cable of the power supply so that the input AC voltage will be divided; and a third capacitor for the prevention of EMI (Electro-Magnetic Interference) which is provided between a grounding line on the secondary side of the transformer and the connection point between the first capacitor and the second capacitor. The capacitance of the second capacitor is set larger than the capacitance of the first capacitor and the second capacitor having the larger capacitance is connected to one of the two AC input lines that is connected to a neutral line of the input AC cable.

In accordance with an eighth aspect of the present invention, in the seventh aspect, capacitance ratio between the first capacitor and the second capacitor is set to approximately 1:10.

In accordance with a ninth aspect of the present invention, in the seventh aspect, the power supply is implemented as a flyback-type power supply.

In accordance with a tenth aspect of the present invention, in the seventh aspect, the power supply is implemented as an RCC-type power supply.

In accordance with an eleventh aspect of the present invention, in the seventh aspect, the power supply is implemented as a forward-type power supply.

In accordance with a twelfth aspect of the present invention, in the seventh aspect, the power supply is employed as a power supply for a portable electronic device.

In accordance with a thirteenth aspect of the present invention, in the seventh aspect, the input AC cable of the power supply is provided with a mark for discriminating between neutral and hot so that the second capacitor having the larger capacitance will be connected to a neutral terminal of an AC socket correctly.

In accordance with a fourteenth aspect of the present invention, in the seventh aspect, a plug at the end of the input AC cable of the power supply is provided with a mark for discriminating between neutral and hot so that the second capacitor having the larger capacitance will be connected to a neutral terminal of an AC socket correctly.

BRIEF DESCRIPTION OF THE DRAWINGS

The objects and features of the present invention will become more apparent from the consideration of the following detailed description taken in conjunction with the accompanying drawings, in which:

FIG. 10 is a circuit diagram showing an AC adapter as a power supply employing a leakage current reduction circuit, in accordance with a third embodiment of the present invention.

DESCRIPTION OF THE PREFERRED EMBODIMENTS

Figure 1:
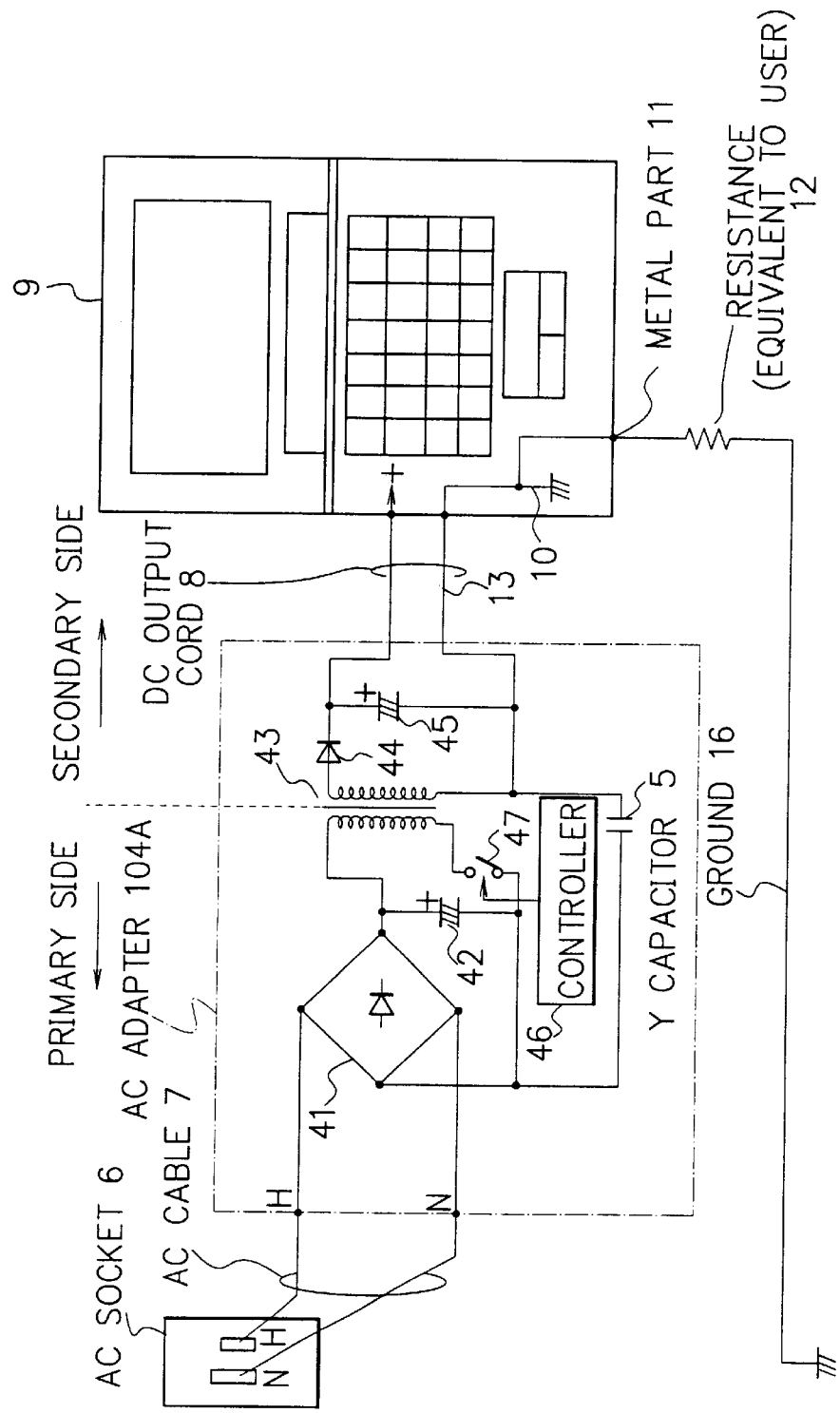
FIG. 1 circuit diagram showing an example of a conventional flyback-type AC adapter employing a Y capacitor.

Referring now to the drawings, a description will be given in detail of preferred embodiments in accordance with the present invention.

Figure 2:
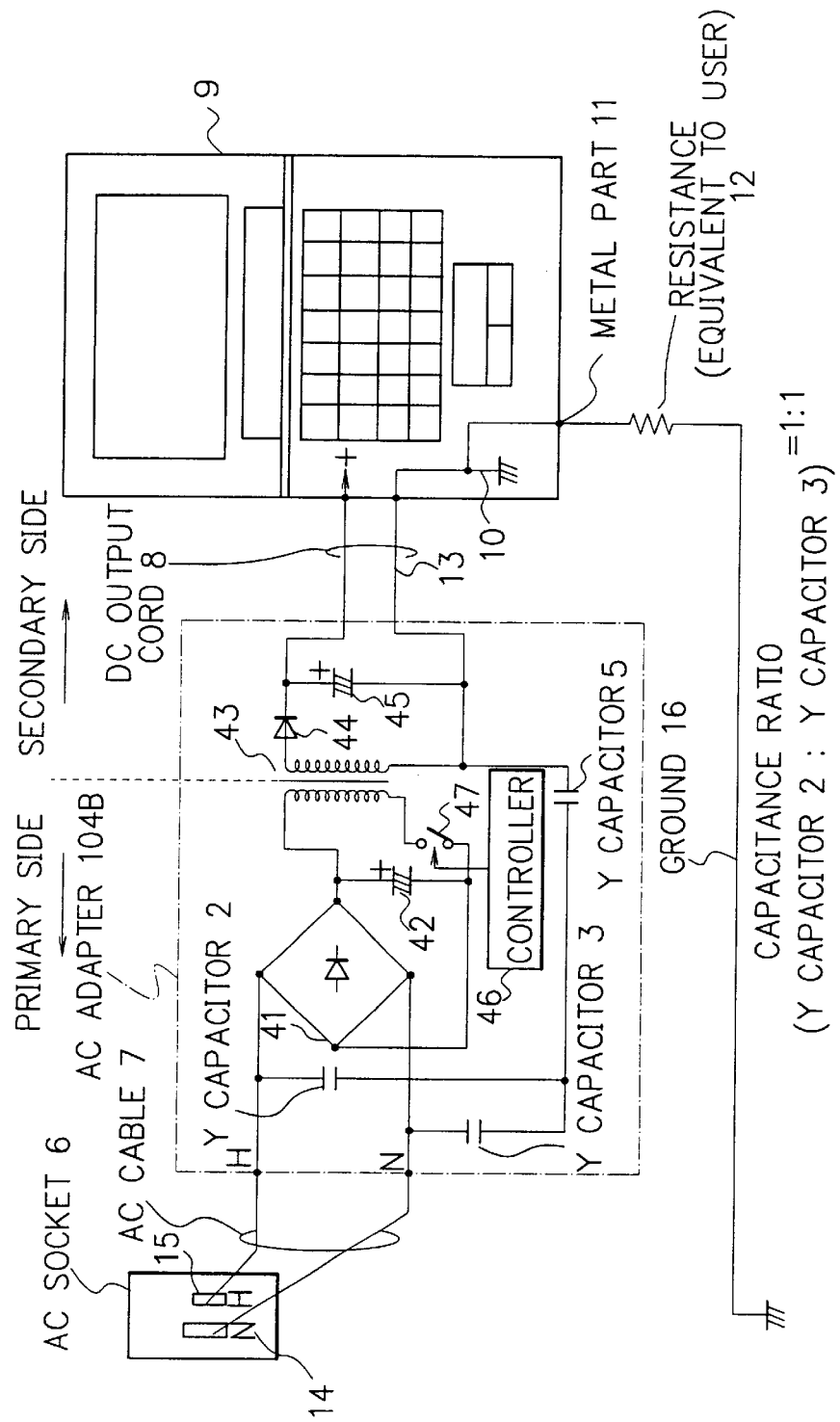
FIG. 2 is a circuit diagram showing another example of a conventional flyback-type AC adapter, in which two Y capacitors are added to the conventional flyback-type AC adapter of FIG. 1.
Figure 3:
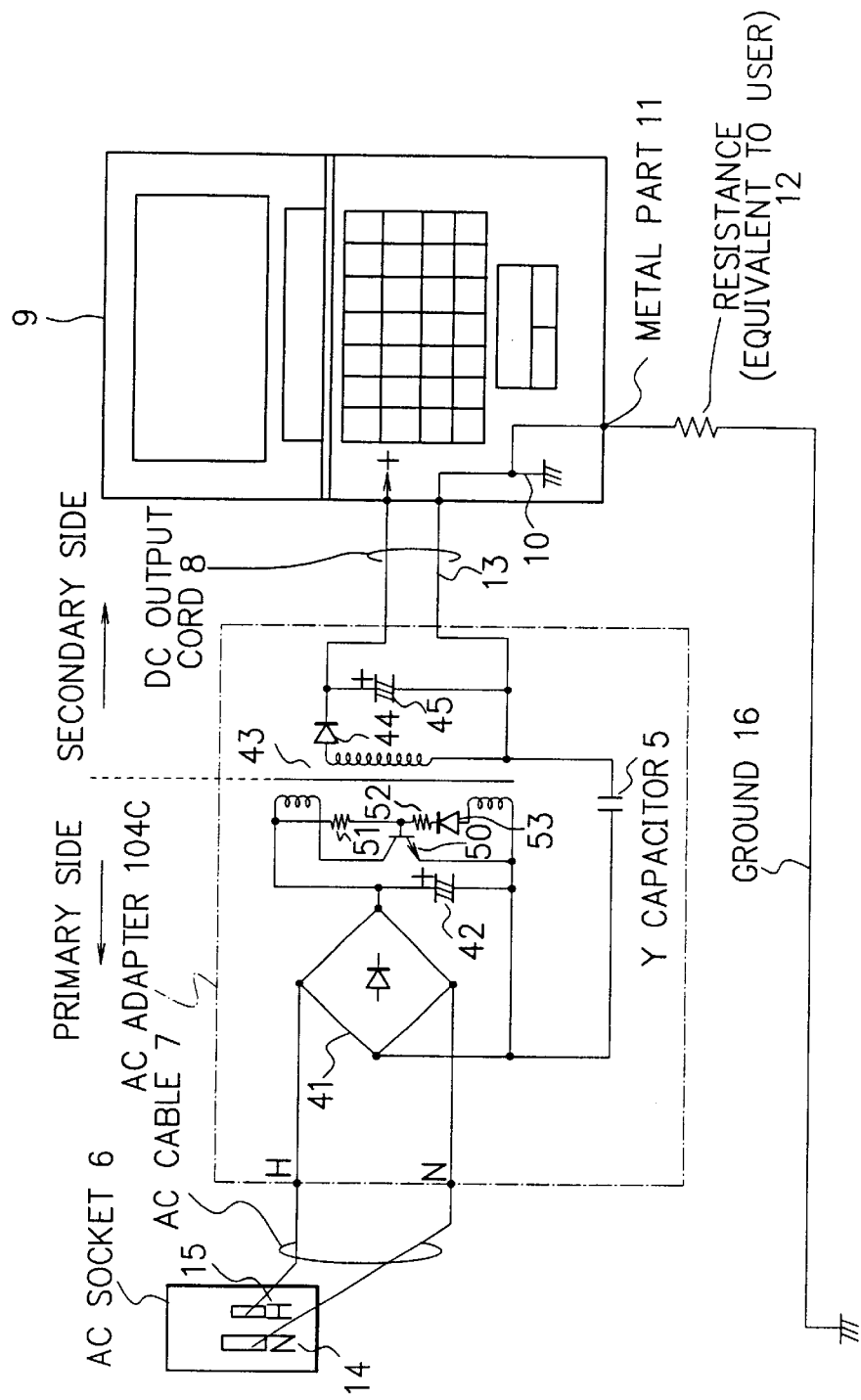
FIG. 3 is a circuit diagram showing an example of a conventional RCC-type AC adapter employing a Y capacitor.
Figure 8:
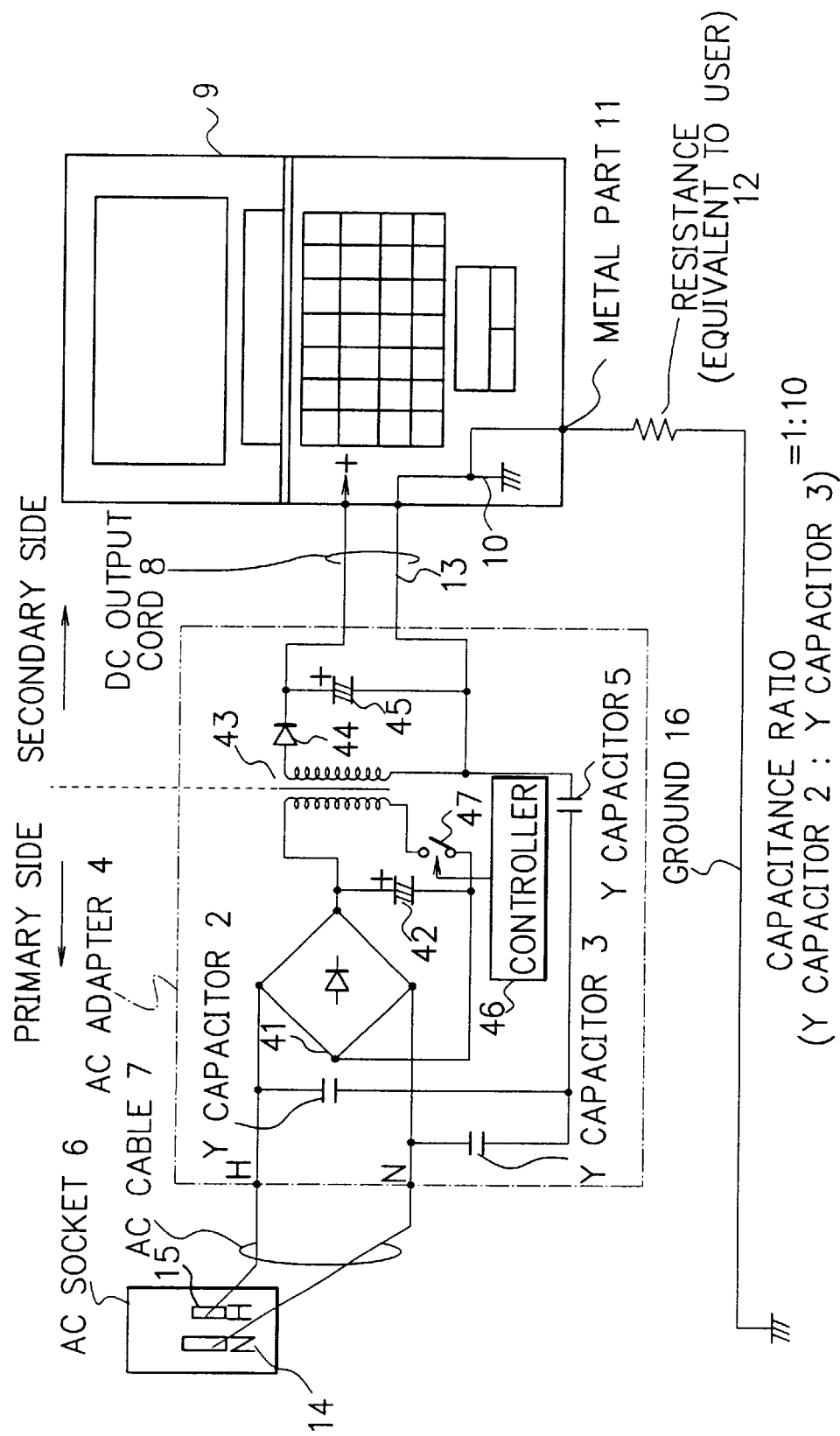
FIG. 8 is a circuit diagram showing an AC adapter as a power supply employing a leakage current reduction circuit, in accordance with a first embodiment of the present invention.

FIG. 8 is a circuit diagram showing an AC adapter as a power supply employing a leakage current reduction circuit, in accordance with a first embodiment of the present invention. The AC adapter 4 shown in FIG. 8 is a switching power supply of flyback type (flyback converter). The AC adapter 4 of FIG. 8 includes a rectifier 41 (which is composed of a diode bridge), a smoothing capacitor 42, a transformer 43, a rectifier 44 (which is composed of a diode), a smoothing capacitor 45, a controller 46, a switching element 47, a Y capacitor 5 for the EMI (Electro-Magnetic Interference) prevention, and two additional Y capacitors 2 and 3, similarly to the conventional AC adapter 104B shown in FIG. 2. Commercial AC power from an AC socket 6 is supplied to the AC adapter 4 through an AC cable 7. The Y capacitors 2 and 3 are connected in series between two AC input lines which are connected to the input AC cable 7, and the connection point between the Y capacitors 2 and 3 is connected to the primary side electrode of the Y capacitor 5, and the secondary side electrode of the Y capacitor 5 is connected to a grounding line 13 on the secondary side of the transformer 43, similarly to the conventional AC adapter 104B shown in FIG. 2.

In the AC adapter 4 of the first embodiment, the capacitance of the Y capacitor 3 is necessarily set larger than that of the Y capacitor 2, and the Y capacitor 3 having the larger capacitance is necessarily connected to the neutral terminal of the AC socket 6. Therefore, the Y capacitor 2 having the smaller capacitance is connected to the hot terminal of the AC socket 6.

The capacitance ratio between the Y capacitors 2 and 3 is set to 1:10, for example. So that the Y capacitor 3 will be connected to the neutral terminal of the AC socket 6 correctly, a mark (for discriminating between neutral and hot) is put on the AC cable 7 or on a plug at the end of the AC cable 7. The opening of the AC socket 6 for the neutral terminal (AC 0V) is usually longer than that for the hot terminal (AC 120V), therefore, the user of the AC adapter 4 seeing the mark on the AC cable 7 or the plug can easily make the correct connection of the AC adapter 4.

The AC adapter 4 is connected to a notebook computer 9 by a DC output cord 8 of the AC adapter 4, and thereby the grounding line 13 on the secondary side of the transformer 43 is connected to metal part 11 and a GND (grounding) terminal 10 of the notebook computer 9 through the DC output cord 8. When the user (equivalent resistance 12 shown in FIG. 8) is touching the metal part 11 of the notebook computer 9, a small voltage difference occurs between the metal part 11 and the ground 16 and thereby a slight leakage current passes through the user.

In the following, the operation of the AC adapter 4 of the first embodiment will be described in detail.

The input AC voltage from the AC socket 6 is rectified by the rectifier 41 and the rectified output of the rectifier 41 is smoothed by the smoothing capacitor 42, thereby conversion of the input AC voltage to a DC voltage is conducted first. The DC voltage is converted again to an AC voltage by on-off action of the switching element 47, and the AC voltage is supplied to the primary coil of the transformer 43. The on-off action of the switching element 47 is controlled by the controller 46.

An AC voltage obtained at the secondary coil of the transformer 43 is converted again to a DC voltage by the rectifier 44 and the smoothing capacitor 45. The DC voltage obtained by the above operation is supplied to the notebook computer 9 through the DC output cord 8.

Due to the capacitance difference between the Y capacitor 2 and the Y capacitor 3, the AC input voltage is divided and thereby the voltage applied to the Y capacitor 5 is reduced. For example, in the case where the input voltage is AC 120V, voltage difference between the ends of the Y capacitor 2 becomes approximately AC 109V and voltage difference between the ends of the Y capacitor 3 becomes approximately AC 10.9V (description of standard calculation is omitted), therefore, an AC voltage of approximately AC 10.9V is applied to the primary side electrode of the Y capacitor 5. Therefore, the voltage difference between the metal part 11 of the notebook computer 9 and the ground 16 becomes approximately AC 10.9V, whereas the voltage difference in the case of the conventional AC adapter 104B of FIG. 2 was approximately AC 60V. By the reduction (1/6 in this example) of the voltage difference between the metal part 11 of the notebook computer 9 and the ground 16, the electric shock problem of the notebook computer 9 can be eliminated or reduced considerably.

As described above, by the leakage current reduction circuit and the power supply in accordance with the first embodiment of the present invention, the voltage difference between the metal part 11 of the electronic device (notebook computer 9, for example) and the ground 16 can be reduced considerably (1/6, for example), thereby the electric shock problem of electronic devices can be eliminated or reduced considerably.

The electric shock problem can be reduced by the embodiment without sacrificing the EMI prevention capability and without the need of the constant connection of the AC adapter 4 to the GND terminal of the three-terminal AC socket etc., therefore, the reduction of the electric shock problem can be attained without deteriorating the portability of the electronic device and the EMI prevention capability.

Figure 9:
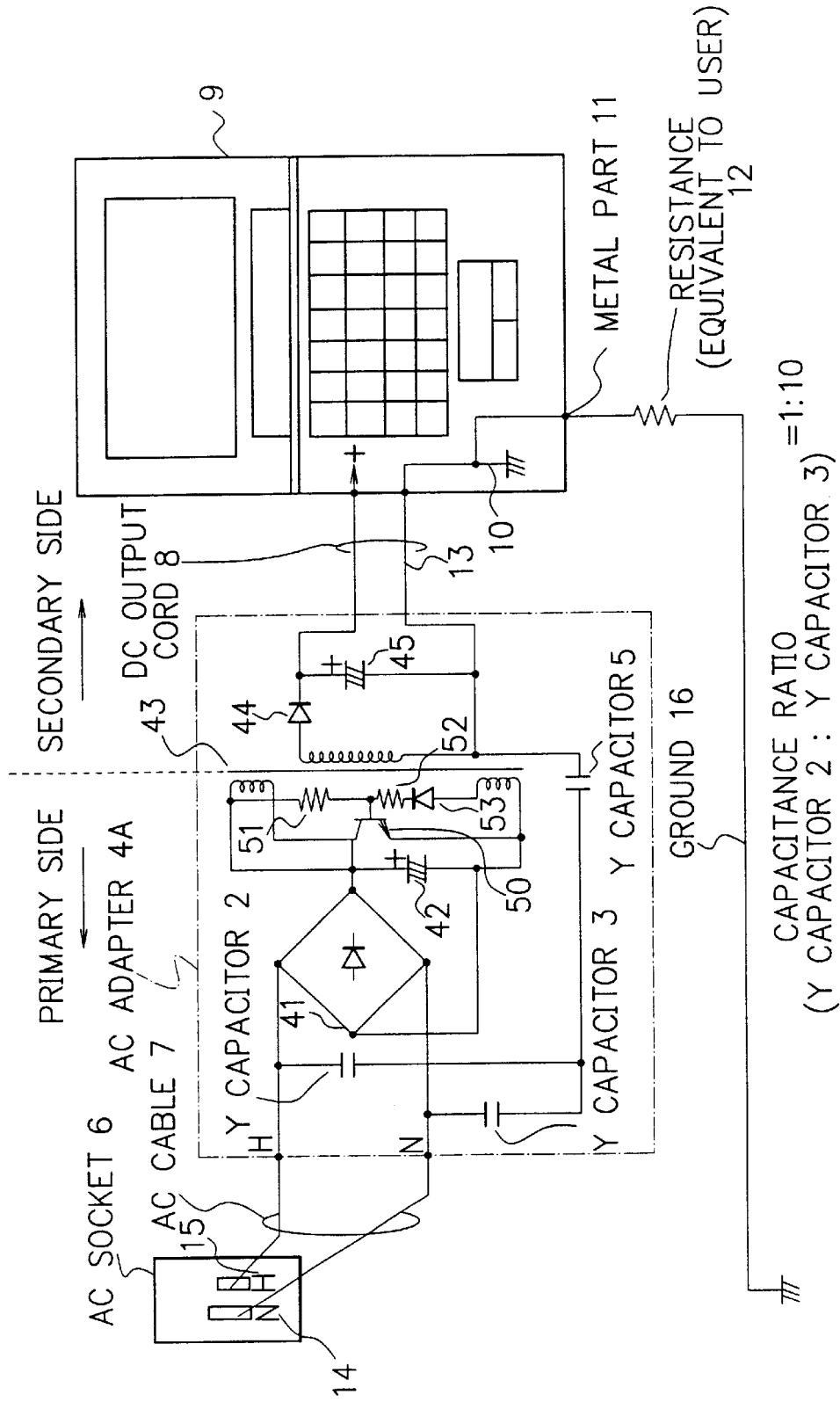
FIG. 9 is a circuit diagram showing an AC adapter as a power supply employing a leakage current reduction circuit, in accordance with a second embodiment of the present invention.

FIG. 9 is a circuit diagram showing an AC adapter as a power supply employing a leakage current reduction circuit, in accordance with a second embodiment of the present invention. In FIG. 9, the same reference characters as those of FIG. 8 designate the same or corresponding parts to those of FIG. 8 and thus repeated description thereof is omitted for brevity. The AC adapter 4A shown in FIG. 9 is implemented as a switching power supply of RCC type (RCC converter).

The AC adapter 4A of FIG. 9, which has different composition from the flyback-type AC adapter 4 of FIG. 8 on the primary side of the transformer 43, includes a switching transistor 50, resistors 51 and 52 and a diode 53 in place of the switching element 47 and the controller 46 of the flyback-type AC adapter 4 of FIG. 8.

Similarly to the AC adapter 4 of the first embodiment, the Y capacitors 2 and 3 are connected in series between the two AC input lines which are connected to the input AC cable 7, and the connection point between the Y capacitors 2 and 3 is connected to the primary side electrode of the Y capacitor 5. The secondary side electrode of the Y capacitor 5 is connected to the grounding line 13 on the secondary side of the transformer 43.

Also in the AC adapter 4A of the second embodiment, the capacitance of the Y capacitor 3 is necessarily set larger than that of the Y capacitor 2, and the Y capacitor 3 having the larger capacitance is necessarily connected to the neutral terminal of the AC socket 6. The capacitance ratio between the Y capacitors 2 and 3 is set to 1:10, for example. For the correct connection of the Y capacitor 3 to the neutral terminal of the AC socket 6, a mark (for discriminating between neutral and hot) is put on the AC cable 7 or on a plug at the end of the AC cable 7.

In the following, the operation of the AC adapter 4A of the second embodiment will be described in detail.

The input AC voltage from the AC socket 6 is rectified by the rectifier 41 and the rectified output of the rectifier 41 is smoothed by the smoothing capacitor 42, thereby conversion of the input AC voltage to a DC voltage is conducted first. The DC voltage is converted again to an AC voltage by on-off action of the switching transistor 50, and the AC voltage is supplied to the primary coils of the transformer 43.

An AC voltage obtained at the secondary coil of the transformer 43 is converted again to a DC voltage by the rectifier 44 and the smoothing capacitor 45. The DC voltage obtained by the above operation is supplied to the notebook computer 9 through the DC output cord 8.

Figure 4:
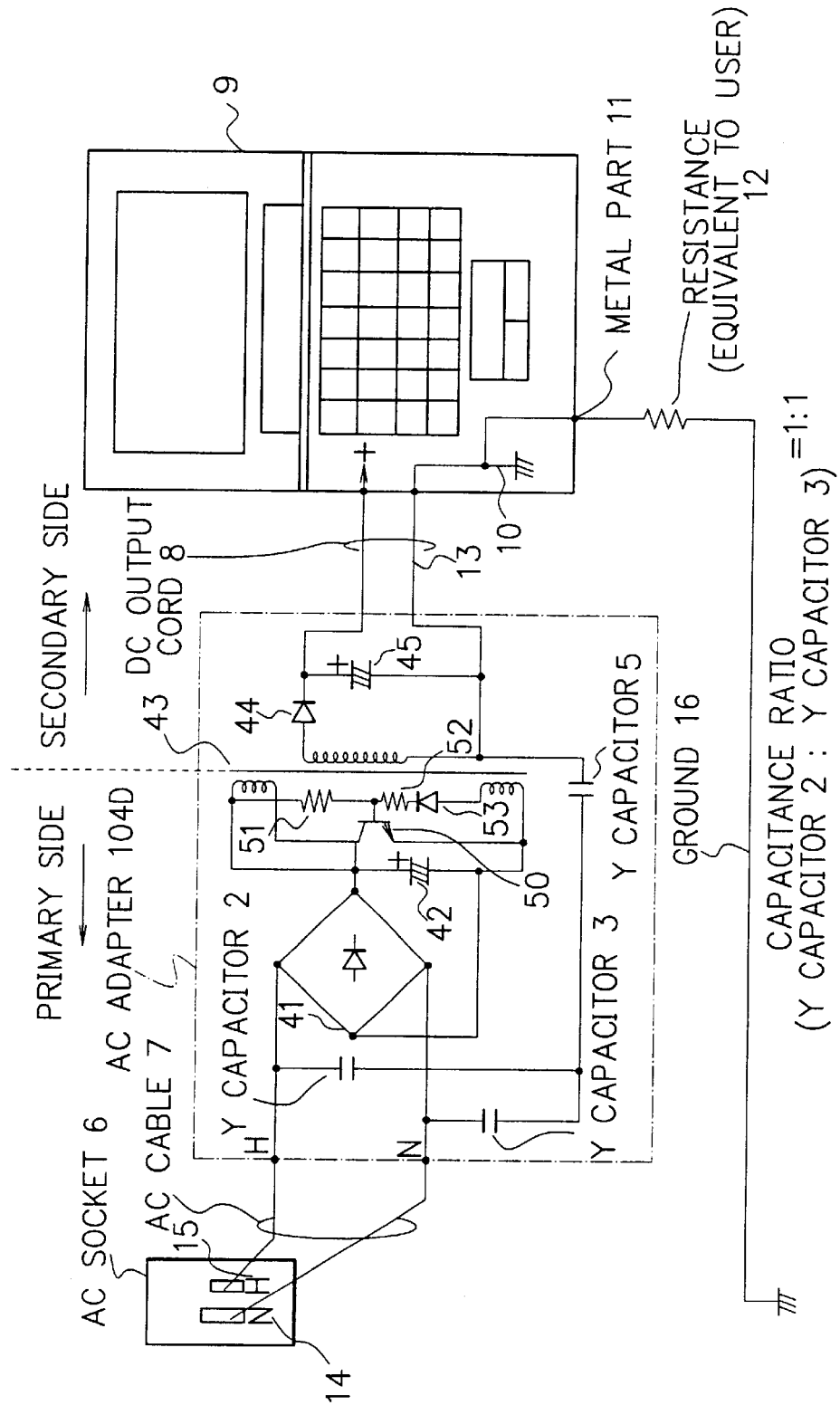
FIG. 4 is a circuit diagram showing another example of a conventional RCC-type AC adapter, in which two Y capacitors are added to the conventional RCC-type AC adapter of FIG. 3.
Figure 5:
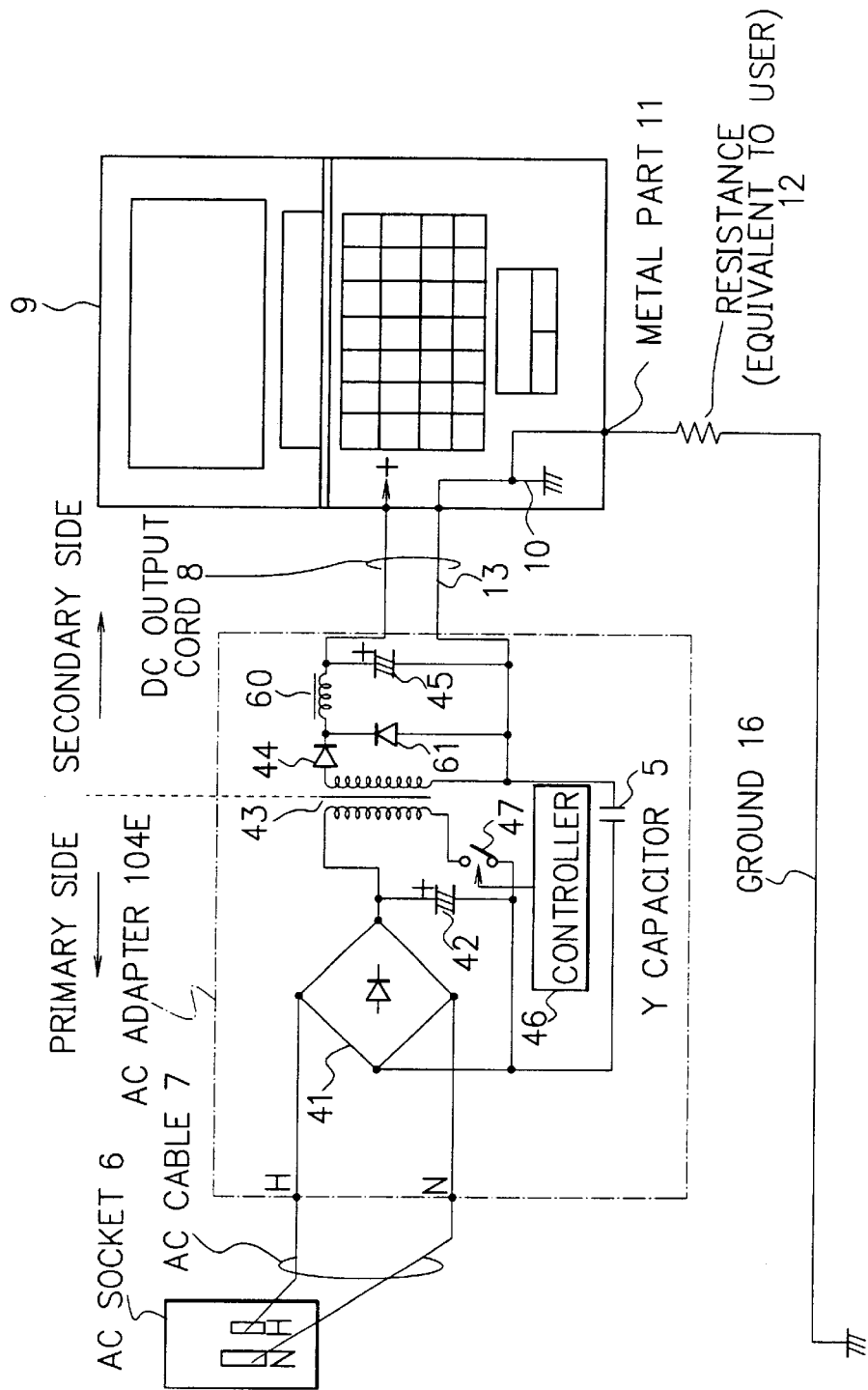
FIG. 5 is a circuit diagram showing an example of a conventional forward-type AC adapter employing a Y capacitor.

Also in the second embodiment, due to the capacitance difference between the Y capacitor 2 and the Y capacitor 3, the AC input voltage is divided and thereby the voltage applied to the Y capacitor 5 is reduced. In the case where the input voltage is AC 120V for example, voltage difference between the ends of the Y capacitor 2 becomes approximately AC 109V and voltage difference between the ends of the Y capacitor 3 becomes approximately AC 10.9V, and thus an AC voltage of approximately AC 10.9V is applied to the primary side electrode of the Y capacitor 5. Therefore, the voltage difference between the metal part 11 of the notebook computer 9 and the ground 16 becomes approximately AC 10.9V, whereas the voltage difference in the case of the conventional AC adapter 104D of FIG. 4 was approximately AC 60V. By the reduction (1/6 in this example) of the voltage difference between the metal part 11 of the notebook computer 9 and the ground 16, the electric shock problem of the notebook computer 9 can be eliminated or reduced considerably.

As described above, also by the leakage current reduction circuit and the power supply in accordance with the second embodiment of the present invention, the voltage difference between the metal part 11 of the electronic device (notebook computer 9, for example) and the ground 16 can be reduced considerably (1/6, for example), and the electric shock problem of electronic devices can be eliminated or reduced considerably. The reduction of the electric shock problem can be attained without deteriorating the portability of the electronic device and the EMI prevention capability.

FIG. 10 is a circuit diagram showing an AC adapter as a power supply employing a leakage current reduction circuit, in accordance with a third embodiment of the present invention. In FIG. 10, the same reference characters as those of FIG. 8 designate the same or corresponding parts to those of FIG. 8 and thus repeated description thereof is omitted for brevity. The AC adapter 4B shown in FIG. 10 is implemented as a switching power supply of forward type (forward converter). The AC adapter 4B of FIG. 10, which has different composition from the flyback-type AC adapter 4 of FIG. 8 on the secondary side of the transformer 43, further includes a choke coil 60 and a diode 61 on the secondary side of the transformer 43.

Similarly to the AC adapter 4 of the first embodiment, the Y capacitors 2 and 3 are connected in series between the two AC input lines which are connected to the input AC cable 7, and the connection point between the Y capacitors 2 and 3 is connected to the primary side electrode of the Y capacitor 5. The secondary side electrode of the Y capacitor 5 is connected to the grounding line 13 on the secondary side of the transformer 43.

Also in the AC adapter 4B of the third embodiment, the capacitance of the Y capacitor 3 is necessarily set larger than that of the Y capacitor 2, and the Y capacitor 3 having the larger capacitance is necessarily connected to the neutral terminal of the AC socket 6. The capacitance ratio between the Y capacitors 2 and 3 is set to 1:10, for example. For the correct connection of the Y capacitor 3 to the neutral terminal of the AC socket 6, a mark (for discriminating between neutral and hot) is put on the AC cable 7 or on a plug at the end of the AC cable 7.

In the following, the operation of the AC adapter 4B of the third embodiment will be described in detail.

The input AC voltage from the AC socket 6 is rectified by the rectifier 41 and the rectified output of the rectifier 41 is smoothed by the smoothing capacitor 42, thereby conversion of the input AC voltage to a DC voltage is conducted first. The DC voltage is converted again to an AC voltage by on-off action of the switching element 47, and the AC voltage is supplied to the primary coil of the transformer 43. The on-off action of the switching element 47 is controlled by the controller 46.

An AC voltage obtained at the secondary coil of the transformer 43 is converted again to a DC voltage by the rectifier 44, the choke coil 60, the diode 61 and the smoothing capacitor 45. The DC voltage obtained by the above operation is supplied to the notebook computer 9 through the DC output cord 8.

Figure 6:
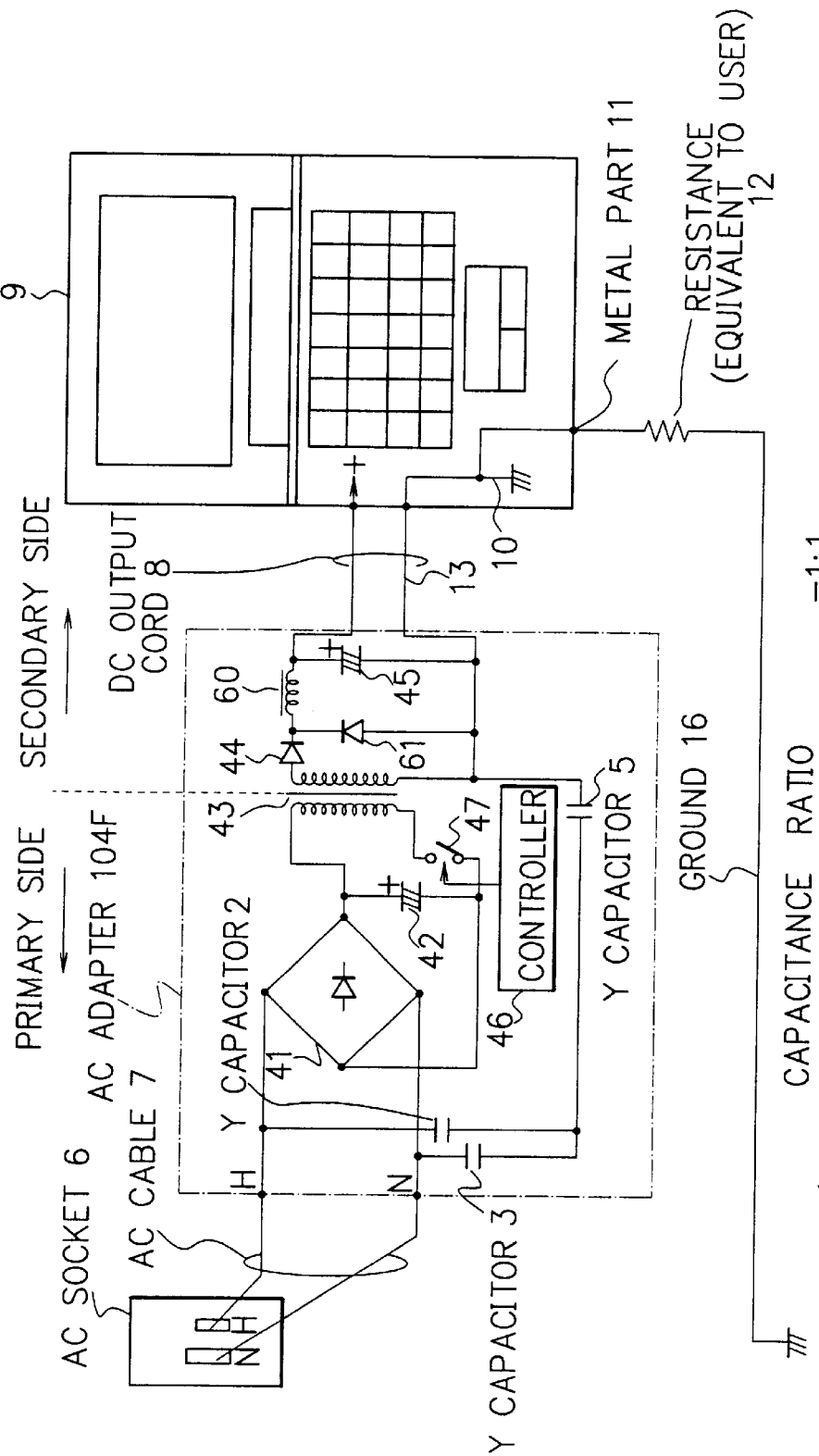
FIG. 6 is a circuit diagram showing another example of a conventional forward-type AC adapter, in which two Y capacitors are added to the conventional forward-type AC adapter of FIG. 5.
Figure 7:
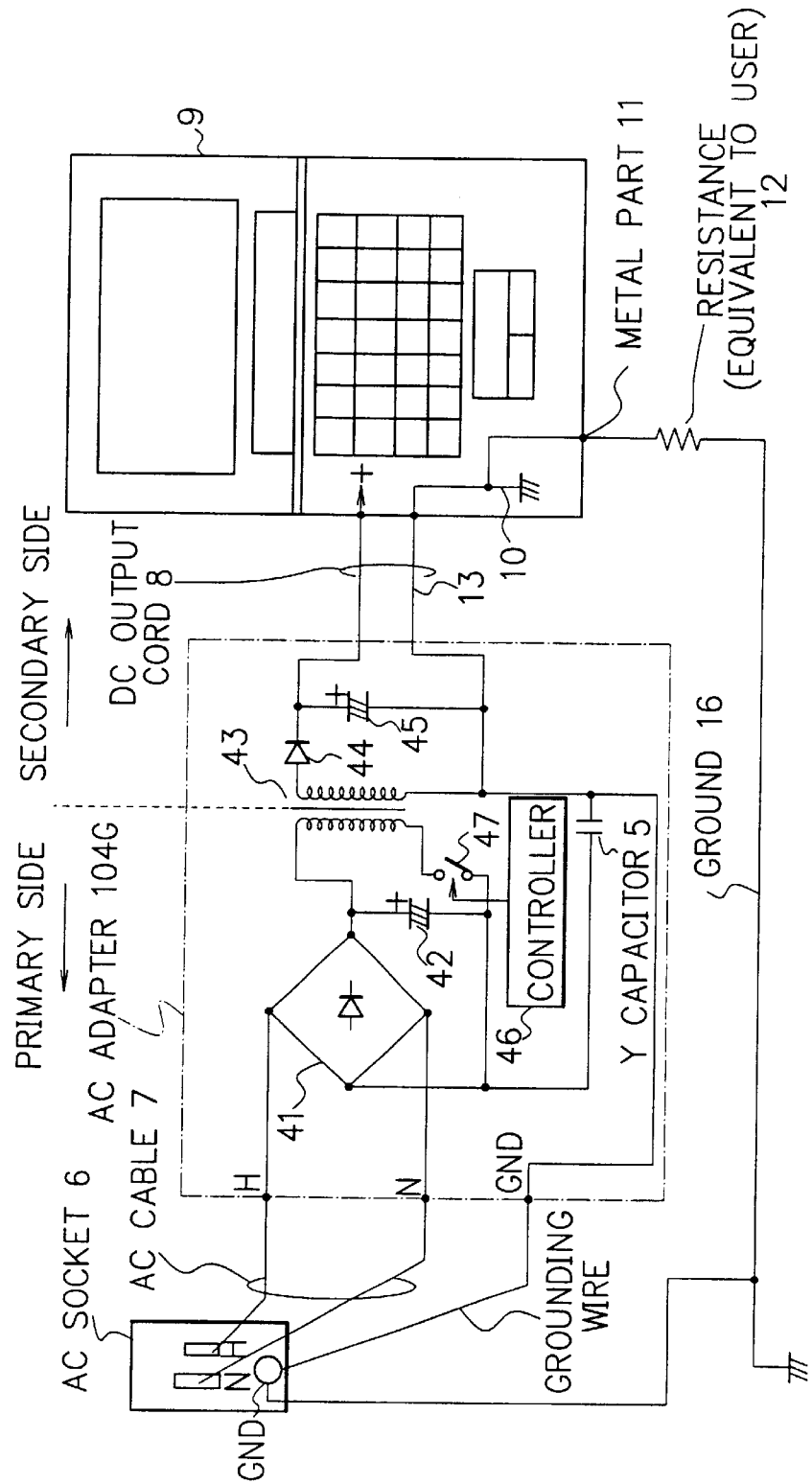
FIG. 7 is a circuit diagram showing an example of a conventional flyback-type AC adapter employing 3-terminal AC input and grounding.

Also in the third embodiment, due to the capacitance difference between the Y capacitor 2 and the Y capacitor 3, the AC input voltage is divided and thereby the voltage applied to the Y capacitor 5 is reduced. In the case where the input voltage is AC 120V for example, an AC voltage of approximately AC 10.9V is applied to the primary side electrode of the Y capacitor 5, and the voltage difference between the metal part 11 of the notebook computer 9 and the ground 16 becomes approximately AC 10.9V, whereas the voltage difference in the case of the conventional AC adapter 104F of FIG. 6 was approximately AC 60V. By the reduction (1/6 in this example) of the voltage difference between the metal part 11 of the notebook computer 9 and the ground 16, the electric shock problem of the notebook computer 9 can be eliminated or reduced considerably.

As described above, also by the leakage current reduction circuit and the power supply in accordance with the third embodiment of the present invention, the voltage difference between the metal part 11 of the electronic device (notebook computer 9, for example) and the ground 16 can be reduced considerably (1/6, for example), and the electric shock problem of electronic devices can be eliminated or reduced considerably. The reduction of the electric shock problem can be attained without deteriorating the portability of the electronic device and the EMI prevention capability.

As set forth hereinabove, by the leakage current reduction circuits and the power supplies in accordance with the present invention, the voltage difference between metal part of an electronic device (employing the leakage current reduction circuit or the power supply) and the ground can be reduced considerably and thereby the electric shock problem of electronic devices can be eliminated or reduced considerably.

The electric shock problem can be reduced without sacrificing the EMI prevention capability and without the need of the constant connection of the power supply to the GND terminal of the three-terminal AC socket etc., and thus the reduction of the electric shock problem can be attained without deteriorating the portability of the electronic device and the EMI prevention capability.

While the capacitance ratio between the Y capacitors 2 and 3 was set to 1:10 and thereby both the reduction of the electric shock problem and the prevention of the EMI were attained in the above embodiments, the capacitance ratio can be varied appropriately as long as the capacitance of the Y capacitor 3 becomes larger than that of the Y capacitor 2. The actual capacitance values of the Y capacitors 2 and 3 should be set properly so that the sizes of the Y capacitors 2 and 3 will not be too large, and so that the EMI prevention capability will be ensured.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A leakage current reduction circuit for a power supply which converts an input AC voltage to a DC voltage, supplies the DC voltage, supplies the DC voltage to the primary side of a transformer intermittently, converts an AC voltage obtained on the secondary side of the transformer to a DC voltage, and outputs the obtained DC voltage, said leakage current reduction circuit comprising:
    a first capacitor;
    a second capacitor, said first capacitor and said second capacitor being connected in series between two AC input lines providing power to said power supply; and
    a third capacitor for the prevention of EMI (Electro-Magnetic Interference), said third capacitor connected between a grounding line on the secondary side of the transformer and the connection point between the first capacitor and the second capacitor,
    wherein the capacitance of the second capacitor is set larger than the capacitance of the first capacitor and the second capacitor having the larger capacitance is connected to one of the two AC input lines that is connected to a neutral line.

2. A leakage current reduction circuit as claimed in claim 1, wherein capacitance ratio between the first capacitor and the second capacitor is set to approximately 1:10.

3. A leakage current reduction circuit as claimed in claim 1, wherein the power supply is a flyback-type power supply.

4. A leakage current reduction circuit as claimed in claim 1, wherein the power supply is an RCC-type power supply.

5. A leakage current reduction circuit as claimed in claim 1, wherein the power supply is a forward-type power supply.

6. A leakage current reduction circuit as claimed in claim 1, wherein the power supply is a power supply that is employed for a portable electronic device.

7. A power supply which converts an input AC voltage to a DC voltage, supplies the DC voltage to the primary side of a transformer intermittently, converts and AC voltage obtained on the secondary side of the transformer to a DC voltage, and outputs the obtained DC voltage, said power supply comprising:
    a first capacitor;
    a second capacitor, said first capacitor and said second capacitor being connected in series between two AC input lines which are connected to an input AC cable of the power supply; and
    a third capacitor for the prevention of EMI (Electro-Magnetic Interference) being provided between a grounding line on the secondary side of the transformer and the connection point between the first capacitor and the second capacitor, wherein the capacitance of the second capacitor is set larger than the capacitance of the first capacitor and the second capacitor having the larger capacitance is connected to one of the two AC input lines that is connected to a neutral line of the input AC cable.

8. A power supply as claimed in claim 7, wherein capacitance ratio between the first capacitor and the second capacitor is set to approximately 1:10.

9. A power supply as claimed in claim 7, wherein the power supply is a flyback-type power supply.

10. A power supply as claimed in claim 7, wherein the power supply is an RCC-type power supply.

11. A power supply as claimed in claim 7, wherein the power supply is a forward-type power supply.

12. A power supply as claimed in claim 7, wherein the power supply is employed as a power supply for a portable electronic device.

13. A power supply as claimed in claim 7, wherein the input AC cable of the power supply is provided with a mark for discriminating between neutral and hot so that the second capacitor having the larger capacitance will be connected to a neutral terminal of an AC socket correctly.

14. A power supply as claimed in claim 7, wherein a plug at the end of the input AC cable of the power supply is provided with a mark for discriminating between neutral and hot so that the second capacitor having the larger capacitance will be connected to a neutral terminal of an AC socket correctly.

15. A power supply converting AC input power into DC power, said AC input power provided on a first line and a second line, said second line being connected to a neutral, said power supply comprising:
    a transformer having a primary side and a secondary side, said primary side receiving said input AC power, said secondary side providing said DC power and having a ground terminal;
    a first capacitor;
    a second capacitor, said first capacitor and said second capacitor connected in series between said first line and said second line; and
    a third capacitor connected between said ground terminal and the connection point between the first capacitor and the second capacitor, wherein a capacitance of the second capacitor is set larger than a capacitance of the first capacitor, and the second capacitor is connected to said second line.

16. The power supply of claim 15, wherein a capacitance ratio between said first capacitor and said second capacitor is set to approximately 1:10.

17. An electronic device having a power supply to convert AC input power into DC power, said AC input power being provided on a first line and a second line, said second line being connected to a neutral, said power supply comprising:

a transformer having a primary side and a secondary side, said primary side receiving said input AC power, said secondary side providing said DC power and having a ground terminal;

a first capacitor;

a second capacitor, said first capacitor and said second capacitor connected in series between said first line and said second line; and a third capacitor connected between said ground terminal and the connection point between the first capacitor and the second capacitor, wherein a capacitance of the second capacitor is set larger than a capacitance of the first capacitor and the second capacitor is connected to said neutral.

18. The electronic device of claim 17, wherein a capacitance ratio between said first capacitor and said second capacitor is set to approximately 1:10.

* * * * *